United States Patent [19]
Luhm

[11] 4,143,580
[45] Mar. 13, 1979

[54] LOCK SPINDLE BLIND RIVET
[75] Inventor: Ralph R. Luhm, Brea, Calif.
[73] Assignee: Allfast, Inc., City of Industry, Calif.
[21] Appl. No.: 752,573
[22] Filed: Dec. 20, 1976
[51] Int. Cl.² ............................................. F16B 13/06
[52] U.S. Cl. ....................................... 85/77; 29/522 A
[58] Field of Search .................... 85/77, 78, 74, 73, 75, 85/76, 72; 29/522, 523

[56] References Cited
U.S. PATENT DOCUMENTS

| | | | |
|---|---|---|---|
| 2,546,602 | 3/1951 | Keating | 85/78 |
| 3,073,205 | 1/1963 | Siebol | 85/78 |
| 3,149,530 | 9/1964 | Kolec | 85/77 |
| 3,292,482 | 12/1966 | Fry et al. | 85/78 |
| 3,302,510 | 2/1967 | Gapp | 85/77 |
| 3,390,601 | 7/1968 | Summerlin | 85/78 |
| 4,012,984 | 3/1977 | Matuschek | 85/77 X |

FOREIGN PATENT DOCUMENTS
472329  9/1937  United Kingdom .................... 85/77

Primary Examiner—Ramon S. Britts
Attorney, Agent, or Firm—Jessup & Beecher

[57] ABSTRACT

A lock spindle blind rivet assembly is provided which is intended to be received in a hole in a workpiece, and which is made up of a sleeve adapted to be received in the hole, a stem having a forward section with an outer diameter slightly less than the inner diameter of the sleeve and a rear section with an outer diameter slightly greater than the inner diameter of the sleeve, the forward and rear sections of the stem being separated by an annular locking groove which forms an annular shoulder around the stem. A collar having an outer diameter greater than the inner diameter of the sleeve, and having an inner diameter slightly greater than the outer diameter of the forward section of the stem but less than the diameter of the annular shoulder, is slidably mounted on the forward section of the stem to be moved back along the forward section to engage and be stopped by the annular shoulder. Thereafter the collar upsets or expands outwardly the rear end of the sleeve against the workpiece as the stem is drawn into the sleeve. The collar thereby causes the rear end of the sleeve to be clamped against the workpiece. Thereafter, the collar is moved or swaged down in to the locking groove in the stem as the rear section of the stem enters the sleeve. The collar is moved through the sleeve to the forward end thereof as the rear section of the stem is drawn into the sleeve, the rear section providing an outward radial clamping action on the sleeve, and the collar forming a lock for the stem at the front of the sleeve when the operation is completed. The forward section of the stem may then be broken off from the rear section at a break line adjacent the front edge of the locking groove.

4 Claims, 6 Drawing Figures

LOCK SPINDLE BLIND RIVET

BACKGROUND OF THE INVENTION

Blind rivets are special rivets that can be set without access to the rear side of the workpiece. Blind rivets find special utility in many applications, and especially in aircraft construction. These rivets are available in many designs, but there are three general types, namely, screw, mandrel and explosive. In the mandrel type, the rivet takes the form of a sleeve, and the rivet is set as the mandrel or stem is pulled through the sleeve. The present invention is concerned with the mandrel type of blind rivet.

Problems have been encountered in the past in the mandrel type of blind rivet, in that when the mandrel is provided with a sufficient diameter to upset the rear end of the sleeve to cause it to clamp against the rear side of the workpiece, the excessive diameter of the mandrel as it is drawn into the sleeve tends to cause dimpling and distortions of the workpiece, especially when the workpiece is relatively thin.

A three-part blind rivet is provided, consisting of stem, sleeve and collar. The stem comprises a means for causing the collar to effectuate the multiple functions of flaring outwardly the rear of the sleeve; and locking together the stem and the sleeve by being swaged into radially aligned annular recesses, namely a flare at the forward end of the sleeve, and a locking groove in the stem. The collar also contributes to radial outward expansion of the sleeve, thereby causing the rivet to fill the bore or hole in the workpieces in which it is secured. The collar is tightly swaged into the locking groove as it is moved by the stem into the sleeve, and then into the sleeve flare by being moved against an external anvil.

The blind rivet of the present invention overcomes the disadvantages of the prior art mandrel-type blind rivet, by providing the mandrel with an outer diameter only slightly greater than the inner diameter of the sleeve. Then, when the mandrel is drawn into the sleeve, its diameter is capable of creating an outward radial clamping action of the sleeve against the workpiece, which is desired, but which is not sufficiently great to cause dimpling or distortions in the workpiece, even though the workpiece may be relatively thin.

The desired upsetting of the rear end of the sleeve against the workpiece is achieved by the rivet of the present invention by means of a separate collar which is composed of a malleable material, and which is slidable on the forward section of the stem or mandrel. As the stem is drawn into the sleeve during the setting of the rivet, the collar slides back along the forward section and surrounds a locking groove located along the stem, separating the forward section of the stem, from the rear section which has an enlarged head of slightly greater diameter. As the stem is drawn into the sleeve, the locking collar engages an annular or radial shoulder defined by the head at the rear edge of the groove. The collar bears against and flares or upsets outwardly the rear end of the sleeve and clamps it against the workpiece. In the process, the locking collar is drawn or swaged down into the locking groove, and the locking collar is then moved or drawn through the sleeve, together with the rear section of the stem as the setting continues. The locking collar and rear section of the stem have sufficient diameter to produce a desired radial outward action against the bore of the sleeve, to cause the sleeve to be clamped against the bore of the hole in the workpiece without creating excessive stresses which would cause distortions in the workpiece.

DETAILED DESCRIPTION OF THE ILLUSTRATED EMBODIMENTS

Figure 1:
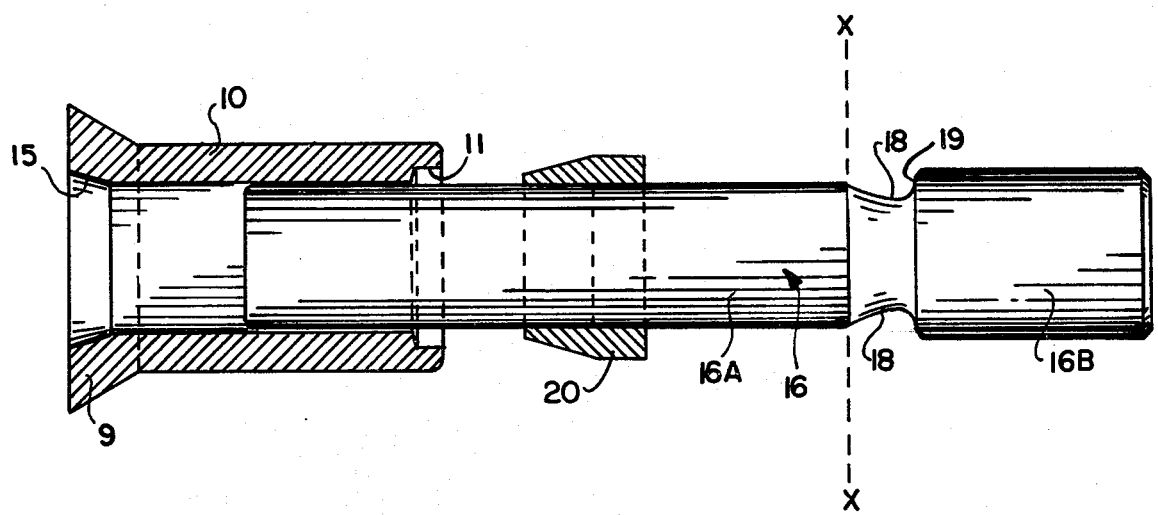
FIG. 1 is a side section of a lock spindle blind rivet assembly constructed in accordance with one embodiment of the invention.

The lock spindle blind rivet assembly of FIG. 1 includes a sleeve 10. The sleeve 10 is flared at its left-hand end to provide a head, as shown at 9, and forward, annular, inward opening recess 15. The sleeve includes an undercut section 11 at its right-hand end. The sleeve 10 is intended, for example, to extend through a hole in a pair of adjacent workpieces 12 and 14. The workpieces, for example, may take the form of metal plates, or sheets, to be riveted together by the rivet assembly of the invention.

The rivet assembly of the invention also includes a stem or pin 16, forming a mandrel which has a forward section 16A of diameter slightly less than the inner diameter of sleeve 10, and which has a rear section or head 16B of diameter slightly greater than the inner diameter of sleeve 10. A locking groove 18 separates the forward section 16A from the rear section 16B of mandrel 16. The fore portion of head 16B forming the rear wall 19 of the locking groove 18 provides an annular shoulder of a diameter slightly less than the diameter of the rest of the rear section 16B and slightly greater than the diameter of section 16A.

A locking collar 20 is coaxially mounted on the forward section 16A of stem 16, and is freely slideable on the forward section. The outer diameter of the locking collar is greater than the inner diameter of the sleeve 10. The inner diameter of the collar 20 is slightly greater than the outer diameter of section 16A and slightly less than the diameter of the annular shoulder 19.

The stem 16 is formed of relatively hard material, such as 7075 or 2024 aluminum, Monel metal, A286 high-temperature stainless, carbon steel, or other suitable materials. The rivet sleeve 10 is formed of a slightly softer material such as 2017 or 2117 aluminum, or other suitable materials. The locking collar 20 is formed of a malleable material, such as Monel metal, 2117 or 5056 aluminum, or other suitable materials. It is preferable that sleeve 10 be formed of a material equally as hard, or slightly harder than, collar 20. A break neck is formed between the rear section 16B and forward section 16A of stem 16, such as designated by the dotted line X, adjacent to the forward edge of the locking groove 18.

Figure 2A:
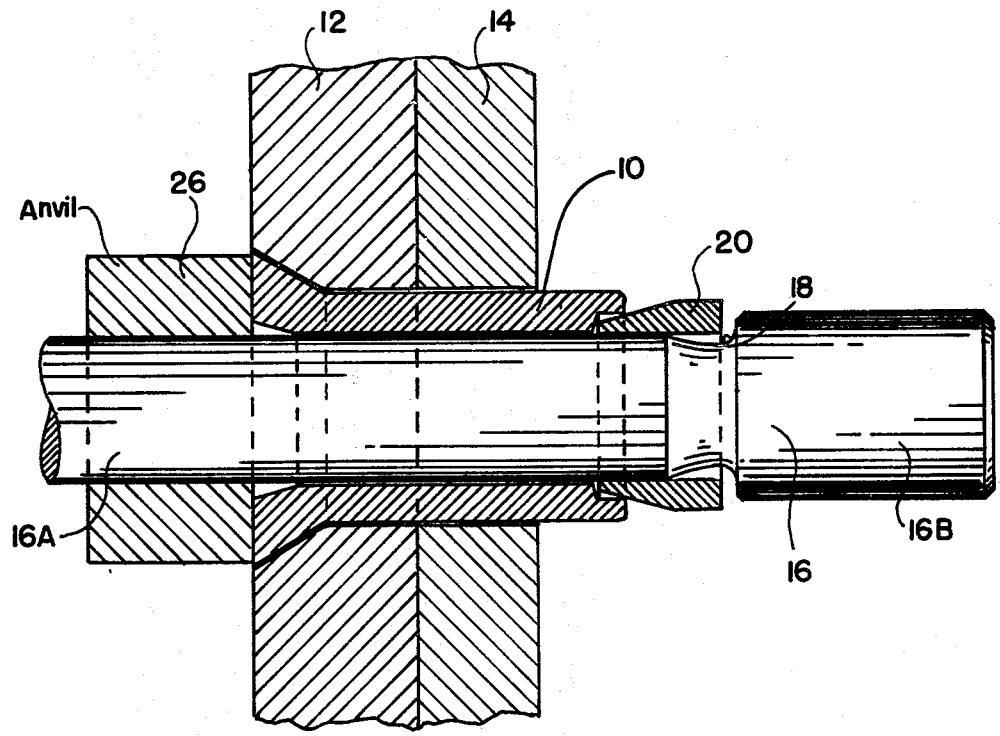
FIGS. 2A-2E are side sections, like FIG. 1, and showing a stem component of the assembly being drawn into a sleeve component, during the setting of the rivet.

The stem 16, sleeve 10, and collar 20 are provided in a pre-assembled lubricated condition, ready for insertion in the holes in workpieces 12 and 14, to assume the position shown in FIG. 2A.

Figure 2B:
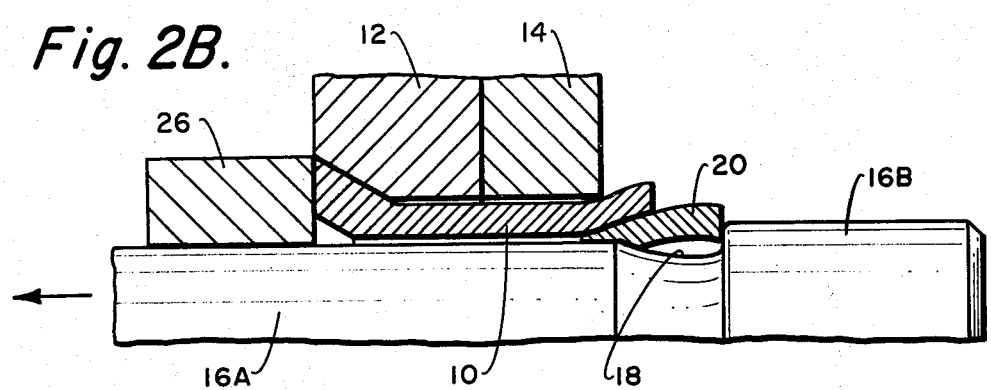
Figure 2C:
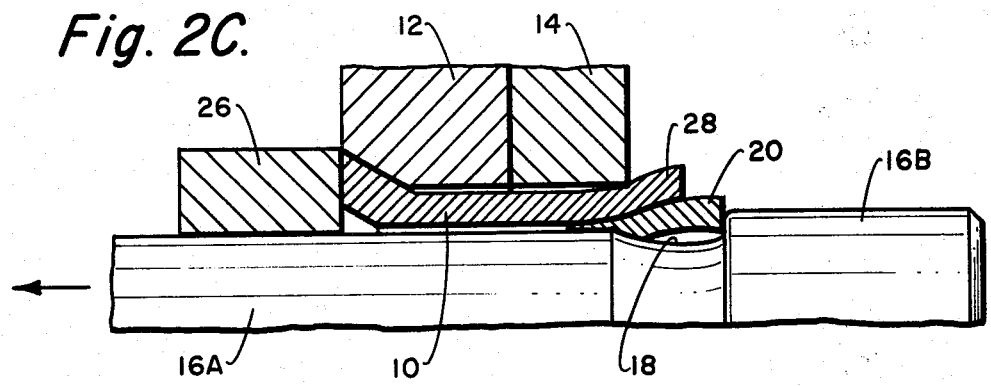

An annular anvil 26 is placed over the forward section 16A of stem 16 against the flared front edge of sleeve 10, as shown in FIG. 2A. The stem 16 is then pulled through the sleeve 10 to set the rivet. As the rear section 16B enters the sleeve 10, as shown in FIGS. 2B and 2C, the collar 20 is moved back into the locking groove 18 and enters the undercut 11 at the rear end of sleeve 10 and against the annular shoulder 19 formed by the rear wall of groove 18, to upset and flare the rear end 28 of the sleeve 10 against the workpiece 14. As the pulling action continues, the collar 20 causes the rear end of sleeve 10 to be forced against the workpiece 14, clamping the workpieces firmly together between the anvil 26 and flared end 28.

Figure 2D:
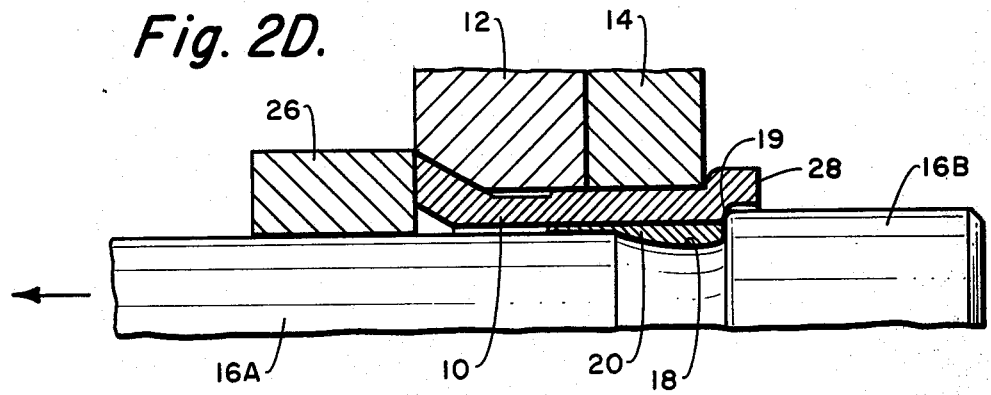

The collar 20 now starts to fill the locking groove 18 and ultimately flows into the locking groove. As shown in FIGS. 2C and 2D, the entrance of collar 20 into the rivet hole in 12 and 14 expands sleeve 10 outward and institutes a hole-filling action. The rear section 16B of stem 16 now enters the rivet sleeve 10, and since its outer diameter is slightly greater than the inner diameter of the sleeve 10, further expansion occurs, by which the sleeve 10 is firmly clamped radially outward against the bore of the hole through the workpieces 12 and 14. However, the outer diameter of section 16B is small enough so that dimpling or other distortions of the workpieces 12 and 14 is obviated.

Figure 2E:
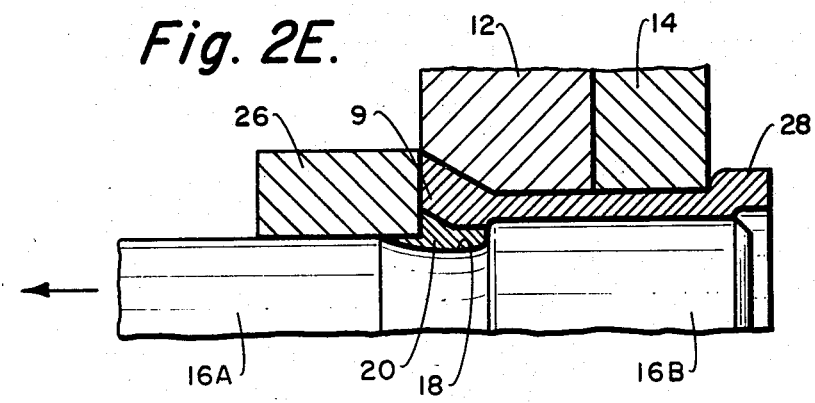

As stem 16 is drawn into the sleeve 10, the locking collar 20 is drawn to the forward end of the sleeve and is trapped by anvil 26. At this point the two annular recesses - the flare at 15 and the locking groove 18 are radially aligned. The collar 20 now flows into the flared portion 9 of the sleeve, as shown in FIG. 2E, to form a lock. The sleeve 10 is firmly held in the hole in the workpieces 12 and 14 by the upset sleeve 10 at the rear end, and by the locking collar 20 at the forward end. The workpieces 12 and 14 are firmly clamped together by virtue of the clamping action of the collar as the stem is drawn into the sleeve, as described above; and the sleeve 16 is firmly clamped radially against the workpieces 12 and 14 by the drawing action of the rear section 16B of the stem, which as shown in FIG. 2E, has an axial length as long as a major portion of the length of the sleeve 10.

As shown, the inner diameter of the sleeve 10 between the recess 15 and the recess 11 is substantially uniform. Thus, as seen in FIGS. 2B-2E, there is no discontinuity presented to the swaging of the collar 20 as it is drawn through the sleeve 10.

After the collar 20 has been displaced into the flared section 9 of the sleeve by a compressive force, and as shown in FIG. 2E, the forward section 16A of the stem may be broken off at the break neck XX (FIG. 1) and the rivet is set.

The initial outer diameter of collar 20 can be almost as large as the outer diameter of sleeve 10. This permits the rear end 28 of sleeve 10 to be flared outwardly by the collar to a large diameter, as shown in FIGS. 2C-2E, and as described above. This also enables the collar to be tightly swaged into groove 18 of stem 16, so that the collar is locked onto the stem, as shown in FIG. 2E, at the completion of the rivet setting operation.

The foregoing assembly provides a relatively large flare 28 at the rear end of sleeve 10, as compared with the prior art blind rivet assemblies, and provides a good solid bearing of the flared end against the workpiece 14. When the setting operation is commenced (FIG. 2B), there is no radial expansion of sleeve 10 inside the holes in the workpieces. Thus, the flared end 28 of sleeve 10 is able to effect a tight clamp between the plates before any radial expansion of the sleeve inside the holes has started. This is an important feature of the invention, that is, the initial clamping action exerted on the workpieces 12 and 14, so that they are firmly clamped together before any internal expansion inside the holes has started.

As the setting action of the rivet assembly of the invention progresses to the stages shown in FIGS. 2C-2E, the drawing action commences as the rear section 16B of the pin 16 is drawn into the sleeve 10. The shoulder 19 at the rear edge of the groove 18 comes to bear against the rear end of sleeve 10 (FIG. 2D), and thereby continues the radially outward clamping action. Then as the rear section 16B is completely drawn into the sleeve 10, the drawing action is complete and the sleeve is swaged radially outward against the bores of the holes in the workpieces 12, 14.

It will be appreciated that although particular embodiments of the invention have been shown and described, modifications may be made. It is intended in the claims to cover the modifications which come within the spirit and scope of the invention.

What is claimed is:

1. A locking rivet comprising:
   a stem having a forward section and a rear section separated by an annular locking groove,
   a sleeve mounted on said forward section, having a head and an annular recess located at the forwardmost end thereof,
   said rear section including an enlarged head having a diameter greater than that of the remainder of said stem, an axial length as long as a major portion of the length of said sleeve, and defining substantially radial shoulder means adjacent said locking groove,
   a malleable locking collar mounted on said stem between said sleeve and said shoulder means and having an outer diameter larger than the inner diameter of said sleeve,
   said collar including means for flaring outwardly the rear end of said sleeve,
   said stem including means for:
   (a) swaging said collar inwardly into said locking groove,
   (b) moving said collar through said sleeve,
   (c) swaging said collar outwardly into said annular recess
   thereby locking together said stem and sleeve,
   the inner bore of said sleeve being substantially free of obstruction to the moving of said collar through said sleeve.

2. Rivet in accordance with claim 1 wherein said annular recess comprises a flare at the forward most end of said sleeve.

3. Rivet in accordance with claim 1 wherein said sleeve is undercut at its rear end, and said collar is tapered at its forward end to facilitate entry of said collar into said sleeve.

4. Rivet in accordance with claim 1 wherein the moving of said collar through said sleeve effectuates outward expansion of said sleeve, so as to substantially completely fill the bore or hole in which the locking rivet is mounted.

* * * * *